United States Patent
Umezawa

(10) Patent No.: US 10,911,295 B2
(45) Date of Patent: Feb. 2, 2021

(54) SERVER APPARATUS, CLUSTER SYSTEM, CLUSTER CONTROL METHOD AND PROGRAM

(71) Applicant: NEC CORPORATION, Tokyo (JP)

(72) Inventor: Yohei Umezawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/343,477

(22) PCT Filed: Oct. 20, 2017

(86) PCT No.: PCT/JP2017/038004
§ 371 (c)(1),
(2) Date: Apr. 19, 2019

(87) PCT Pub. No.: WO2018/074587
PCT Pub. Date: Apr. 26, 2018

(65) Prior Publication Data
US 2019/0245735 A1    Aug. 8, 2019

(30) Foreign Application Priority Data

Oct. 20, 2016 (JP) .................. 2016-205939

(51) Int. Cl.
*H04L 12/24* (2006.01)
*H04L 12/26* (2006.01)
*G06F 11/20* (2006.01)
(Continued)

(52) U.S. Cl.
CPC .......... *H04L 41/0663* (2013.01); *G06F 11/20* (2013.01); *H04L 43/08* (2013.01);
(Continued)

(58) Field of Classification Search
CPC ..... H04L 43/10; H04L 43/103; H04L 43/106; H04L 43/0829; H04L 43/0835;
(Continued)

(56) References Cited

U.S. PATENT DOCUMENTS 7,209,551 B1 * 4/2007 Schroeder ............... H04L 51/36
370/401
2002/0152446 A1 * 10/2002 Fleming ............... G06F 11/0715
714/815

(Continued)

FOREIGN PATENT DOCUMENTS

| CN | 104601376 A | 5/2015 |
|---|---|---|
| JP | 2006-048477 A | 2/2006 |
| JP | 2006-146299 A | 6/2006 |
| JP | 2011-203941 A | 10/2011 |
| JP | 2015-032219 A | 2/2015 |

OTHER PUBLICATIONS

International Search Report of PCT/JP2017/038004 dated Jan. 16, 2018.

*Primary Examiner* — Christopher M Crutchfield
(74) *Attorney, Agent, or Firm* — Sughrue Mion, PLLC

(57) ABSTRACT

In a cluster system having two server apparatuses that operate as an in-use type or a standby type, a first server apparatus is provided with: a heartbeat transmission/reception part that transmits and receives heartbeat packets to and from a corresponding second server apparatus; and a corresponding node monitoring part that adjusts a timeout period for transitioning operation of the first server apparatus from a standby type to an in-use type, according to the reception state of the heartbeat packets.

17 Claims, 8 Drawing Sheets

(51) Int. Cl.
*H04L 29/08* (2006.01)
*H04L 29/14* (2006.01)

(52) U.S. Cl.
CPC .......... *H04L 43/0894* (2013.01); *H04L 43/10* (2013.01); *H04L 43/16* (2013.01); *H04L 67/10* (2013.01); *H04L 69/40* (2013.01)

(58) Field of Classification Search
CPC ..... H04L 43/0841; H04L 69/40; H04L 67/10; H04L 67/1034; H04L 67/1095; H04L 67/1004; H04L 67/1025; H04L 67/1027; H04L 67/1029; H04L 67/1031; H04L 67/1036; H04L 67/1038
See application file for complete search history.

(56) References Cited

U.S. PATENT DOCUMENTS

| | | | |
|---|---|---|---|
| 2008/0014961 A1* | 1/2008 | Lipps | H04L 69/40 455/456.1 |
| 2010/0232288 A1* | 9/2010 | Coatney | G06F 11/2033 370/221 |
| 2014/0108339 A1* | 4/2014 | Marsden | G06F 16/273 707/611 |
| 2015/0019901 A1 | 1/2015 | Griffith et al. | |
| 2016/0117213 A1 | 4/2016 | Arjun et al. | |
| 2017/0262240 A1* | 9/2017 | Osaki | G06F 3/1212 |
| 2019/0266059 A1* | 8/2019 | Okuno | G06F 11/3055 |

* cited by examiner

SERVER APPARATUS, CLUSTER SYSTEM, CLUSTER CONTROL METHOD AND PROGRAM

CROSS-REFERENCE TO RELATED APPLICATIONS

The present application is a National Stage of International Application No. PCT/JP2017/038004 filed Oct. 20, 2017, and claims priority from Japanese Patent Application No. 2016-205939 (filed on Oct. 20, 2016) the contents of which are hereby incorporated in their entirety by reference into this specification. The present invention relates to a server apparatus, a cluster system, a cluster control method and a program, and in particular to a server apparatus provided in a cluster system, a cluster system provided with a plurality of server apparatuses, a cluster control method and a program.

BACKGROUND

Field

In a system in which high reliability or high availability is required, a method is used in which a cluster system is configured by a plurality of server apparatuses, by giving redundancy to the system.

As principal configurations of a cluster system, an Active-Standby (ACT-SBY) configuration and an N-ACT (Active) configuration are known.

The ACT-SBY configuration is provided with two server apparatuses. In normal operation only a server apparatus of an in-use type (ACT, Active) is active, and a server apparatus of a standby type (SBY, Standby) is inactive. When a failure occurs in the server apparatus of the in-use type (ACT), provision of service is continued by processing of the server apparatus of the in-use type (ACT) being handed over to the server apparatus of the standby type (SBY).

On the other hand, an N-ACT configuration makes a plurality of server apparatuses operate at the same time. That is, the N-ACT configuration has a redundant configuration whereby a server apparatus carrying out processing takes on a standby role for another server apparatus at the same time.

As related technology, Patent Literature 1 describes technology to switch a heartbeat transmission channel to go via a general LAN (Local Area Network), in a case where communication of a monitoring signal (heartbeat) via a heartbeat LAN is not possible.

Patent Literature 2 describes technology of calculating assignment time in which respective processes can be executed at respective nodes, and the respective nodes can execute processing within the assigned time, so that processing at two nodes is not activated at the same time.

In addition, Patent Literature 3 describes a split brain recovery system for restoring data updated by two server apparatuses after the occurrence of a failure, when a remote cluster system is split by a network failure, such that no difference occurs between the two after recovery from failure.

Patent Literature 4 describes technology for monitoring a heartbeat signal transmitted periodically from a target server, and in a case where the heartbeat signal is not received after a set period, detects a failure occurrence of the target server and executes failover.

[Patent Literature 1]
Japanese Patent Kokai Publication No. JP2011-203941A
[Patent Literature 2]
Japanese Patent Kokai Publication No. JP2006-048477A
[Patent Literature 3]
Japanese Patent Kokai Publication No. JP2006-146299A
[Patent Literature 4]
Japanese Patent Kokai Publication No. JP2015-032219A

SUMMARY

The entire disclosed contents of the abovementioned Patent Literatures are incorporated herein by reference thereto. The following analysis is given according to the present inventor.

In an N-ACT (Active) configuration, it is possible to flexibly change a multiplicity of backups. Therefore, it is possible to improve equipment usage efficiency in comparison to an ACT-SBY (Active-Standby) configuration. There is also an advantage in that a problem such as a split brain described later does not easily occur. However, particularly in the field of carrier oriented products and solutions, the ACT-SBY configuration is often used rather than the N-ACT configuration. A reason for this is because of advantages in the ACT-SBY configuration such as (1) to (3) below.

(1) In a case of the N-ACT configuration, the same service is multiply activated in a plurality of server apparatuses, and these are operated at the same time. At this time, a synchronizing mechanism is required for maintaining data consistency among the plurality of ACT (Active) nodes. In a case of a stateless cluster system not holding state data, it is possible to realize an N-ACT configuration relatively easily. On the other hand, in a stateful cluster system holding state data, high level technology is necessary for a synchronization mechanism. Therefore, there is a problem in that generally the N-ACT configuration cluster system is expensive, and practical use is difficult. On the other hand, an ACT-SBY configuration can be realized by simpler technology than for the N-ACT configuration. Therefore, the ACT-SBY configuration system has a merit in that system installation cost and practical use cost can be easily reduced. Carrier oriented products and solutions are often stateful systems requiring that the state be maintained. Thus, in one aspect, the ACT-SBY configuration may be more easily applied than the N-ACT configuration.

(2) In a case of the ACT-SBY configuration, a cluster system may be accessed by a single IP address from a corresponding node by a floating IP (Internet Protocol) address. Therefore, even in the case of setting with a redundant configuration, there is an advantage in that there is little impact on the corresponding node. For example, for a cluster system of 1 set of ACT-SBY configurations, there is no need to implement a mechanism to assign to a plurality of nodes on the corresponding node side. That is, it is easier to install a redundant configuration with the ACT-SBY configuration in comparison with the N-ACT configuration, and it is adopted more widely.

(3) In the N-ACT configuration, a server apparatus in processing fulfills the role of a standby system for another apparatus at the same time, without making a dedicated standby (SBY) server apparatus to stand by, as in the ACT-SBY configuration. Therefore, the N-ACT configuration may be installed with an object of improving equipment usage efficiency. In a case of using the N-ACT configuration for this object, cluster system multiplicity (that is, number of server apparatuses) is minimized as much as possible. Therefore, in a case where one or a plurality of server apparatuses within a system fail (that is, a failure occurs), and operation is continued within the processing capacity of the remaining server apparatuses (that is, degraded operation), there is a risk of processing capability being insufficient. On the other hand, with the ACT-SBY configuration, one dedicated standby system (SBY) is provided for one in-use system (ACT). Therefore, in a case where a failure occurs, it is possible to continue operation with the same number of server apparatuses as before the failure occurrence. That is, the ACT-SBY configuration may be said to be a system with higher fault tolerance than the N-ACT configuration. Therefore, in a carrier oriented system requiring high reliability and availability (for example, it is necessary that even where one server apparatus fails, required processing capability is provided by the remaining server apparatuses), in general the ACT-SBY configuration is more applicable than the N-ACT configuration.

Thus, the following focuses on an ACT-SBY configuration cluster system. It is to be noted that with the ACT-SBY configuration cluster, there is a possibility of a split brain state, as described later, occurring. The present invention solves at least one problem related to the split brain with regard to an ACT-SBY configuration.

In an ACT-SBY configuration cluster system configured by 2 nodes, normally heartbeat packets are reciprocally transmitted at periodic time intervals (for example, every 1 second). Thus, the state of a node itself (for example, information indicating whether it is operating normally, or whether the node state is an in-use type or a standby type) is notified to a corresponding node. In a standby type node, in a case where a heartbeat packet has not arrived from a corresponding node (in-use type node) in a fixed period (that is, when a timeout occurs), a judgment is made that a failure has occurred at a corresponding in-use type node, and the node itself starts operation as an in-use type (for example, starts a service, makes a floating IP address active or the like, that is, failover processing). In the cluster system in question, there is a risk of problems occurring as described in detail below.

(1) First Problem

As described above, in the cluster system of an ACT-SBY configuration, there is the problem of an occurrence of the split brain phenomenon described below due to a communication failure of a heartbeat packet (first problem).

In a case where an actual failure occurs in the original in-use type node and service is interrupted, failover processing by the abovementioned mechanism functions without a problem. In this case, it is possible to continue providing a service by the standby type switching to in-use type. Meanwhile, interruption of heartbeat packet delivery may be not due to failure of an in-use type node, but due to temporary failure or unstable operation of a network in a heartbeat communication path. In a case where heartbeat packet loss or transmission delay occurs for these reasons, the in-use type node continues in-use type operations without change. At this time, if the standby type node starts operations as an in-use type node, both nodes operate as an in-use type, and fall into a state known as "split brain". In a split brain state, in general, consistency between the two nodes within a cluster is lost, and normal operation is not possible. Therefore, there is a demand to avoid the occurrence of a split brain due to communication failure of heartbeat packets (first problem).

When a split brain state occurs in a cluster system, the following types of problem may additionally occur. That is, in a system using a shared disk, there is a risk of data being destroyed by data being rewritten at the same time from the two nodes.

There is also a risk of a problem occurring in a cluster system having a database (DB) in a local disk of each server apparatus (a system that synchronizes a DB as needed in both local disks), without using a shared disk. In the system in question there is no danger of data being destroyed as described above. However, while basically only one server apparatus in a cluster should operate as an in-use type, there is a risk of consistency of data among the two nodes being lost, by both nodes each operating independently as an in-use type and local data of each being updated.

Even with a system having a function to synchronize local data after restoration of communication between the two nodes and data restoration being possible, service will be provided by the two nodes activating the same floating IP address while a split brain is occurring. At this time, an external node (mutually connected corresponding node or end user terminal) accessing the cluster system can no longer access the cluster system, or is routed to any node that can be reached depending on IP routing.

There is a case where if an access destination node changes in the middle of a call/session during connection, continuation of the service becomes impossible. For example, in a case where there is an interruption in communication for synchronization of a DB or call/session information between the two nodes before a split brain occurs, and information thereof is not handed over to a standby type, this type of problem may occur.

As described above, in a case where a split brain occurs, it is assumed that various problems occur. Therefore, it is necessary to prevent a split brain before it occurs.

Also, with regard to an IP network, packet loss or temporary delay in packet delivery may occur. In particular, in a case of using a geographical redundant configuration in which 2 nodes within a cluster system are disposed at respectively different sites geographically separated, heartbeat packets between 2 nodes may be exchanged not by a high speed dedicated line, but via a normal IP network (WAN (Wide Area Network) or the like) connecting between sites. In such a case, the probability of interruption or delay of heartbeat packets occurring increases.

The following method may be considered for solving the problem of an erroneous failover (split brain) due to heartbeat packets not arriving in a fixed period due to a network failure. That is, a method may be considered in which a timeout period, from when a heartbeat packet interruption is detected until a judgment of corresponding node failure, is set in advance to be long, and the probability of a failover occurring is lowered. However, in a system in which high reliability is required as in a telecommunication system, service stoppage time when a node failure occurs is required to be made as short as possible. Therefore, in order to detect a failure occurrence of a corresponding node in a short time, it is necessary to set the timeout period for a heartbeat to be short, but adopting the relevant method is difficult.

From the above, it is desired to prevent the occurrence of inappropriate failover (split brain) (first problem) due to nondelivery or delay of heartbeat packets due to a network failure, while maintaining responsiveness of detection/failover of corresponding node failure as much as possible.

(2) Second Problem

In the cluster system with the ACT-SBY configuration, after a split brain occurs, there is a problem of an effect extending to services being executed (second problem).

As described in the first problem, in a cluster system with the ACT-SBY configuration, in a case where a heartbeat arrival from an in-use type at a standby type node is interrupted for a fixed time and a timeout occurs, a corresponding node failure is recognized and an operation is started with itself as an in-use type (that is, failover processing is executed). However, in actuality the reason may be a temporary stoppage of a network rather than a node failure, and the original in-use type may continue operations as an in-use type (that is, a split brain occurs). In this case also, it is desirable to return to a normal state, while curbing the effect on service being executed to a minimum.

A reason for this is because, in a call/session in which a node that is an access destination does not change after a split brain occurrence, it is necessary to maintain the call/sessions, with a state where the service (call connection) continues without change. Furthermore this is because, with regard to a transaction request or call processing request to the system, newly generated after the split brain occurrence, since service processing is executed by the accessing node, maintenance thereof is necessary.

In a case where heartbeat communication is restored and it is possible to comprehend the state of reciprocal nodes, in order to return the system to a normal state, it is necessary to promptly execute an operation to maintain one of the nodes as an in-use type, and to transition the other node to a standby type. The reason for this is because the split brain state may be said to be an abnormal state lacking redundancy with failover impossible, in addition to various negative effects occurring in the system as described above.

As described above, there is a possibility of a continuing call/session existing even after the occurrence of a split brain. However with regard to call or a session at a node that is transitioned to a standby type after heartbeat recovery, a service shut down occurs at the moment the transition operation to a standby type is performed.

For a service completed by only a simple request/response, since by accessing an in-use type continuing to exist by retrying, the service is completed, the effect on service is small. However in a telecommunications system where it is necessary to maintain a call state over a long time, synchronization is not performed between nodes in a call state at timing of recovery from a split brain. Therefore, a call is not saved at timing of switching to a standby type, and the call is disconnected. However, in a carrier system requiring high availability, at an abnormality occurrence time/recovery operation time when heartbeat communication is interrupted, it is required to maintain a connected call as much as possible.

As an example, a method may be considered of transitioning a node that was operating as an in-use type until directly (immediately) before going into a split brain state, to standby type, without change, directly after the split brain occurrence. However, according to the method in question, since almost all transactions/connected sessions (calls) held in the system are present in the node in question, there is a problem of the effect on service being very large.

Therefore, in the case of a state where it is not possible to compare number of sessions held and data synchronization among two nodes, while detecting a split brain state, it is necessary to prevent the original in-use type node from transitioning to standby type directly after a split brain occurrence. That is, in such a case it is desirable that the original in-use type node maintains in-use type operations at least through a fixed period.

Here, as a state where it is not possible to compare number of sessions held and data synchronization among two nodes while detecting a split brain state, a case may be considered of a heartbeat in only one direction from the original in-use type to standby type being interrupted, leading to a split brain.

After the heartbeat communication is interrupted in both directions and a split brain state occurs, if the state is one where heartbeat communication in both directions is restored (a state where communication in both directions is possible), both nodes can exchange information related to the number of transactions or sessions (calls) held by a node itself, using heartbeat packets. At this time, for example after session information of a node with a smaller number of sessions is synchronized via a heartbeat communication path to another node, it is possible for the node with the smaller number of sessions to transition immediately to a standby type.

On the other hand, in a state where only a one-directional heartbeat packet from original (previous) in-use type to original standby type is interrupted leading to a split brain, a node that comprehends that a split brain has occurred is only the original in-use type node on the side receiving the heartbeat packet. At this time, whether the split brain is overcome by transitioning the node itself to a standby type, and timing thereof, are left to the judgment of the original in-use type node.

However, in a case where the cluster system remains in a split brain state for a long time, there is a risk of various negative effects as described above. Therefore, even in a case of a state continuing, where comparison of the number of sessions held and data synchronization are not possible, it is preferable to perform a transition operation to standby type at some timing.

Below, in the cluster system with the ACT-SBY configuration, a case where the second problem occurs (the problem of an effect extending to service being executed after a split brain occurs) is specifically described.

(2-1) Case where a Heartbeat Packet Interruption (Timeout) is in Both Directions Between in-Use Type and Standby Type.

In this case, the standby type node recognizes that a failure has occurred in a corresponding node (in-use type node), and starts operating as an in-use type. However, since heartbeats are interrupted in both directions, the original in-use type node cannot comprehend that the original standby type node has started operating as an in-use type node. Therefore, the original in-use type node continues operating as an in-use type without change. At this point in time, a split brain occurs, where with both nodes operate as an in-use type.

Here, in a case where heartbeats in both directions recover, both nodes performing operations as an in-use type comprehend that a corresponding node is operating as an in-use type similar to the node itself, based on information in respective received heartbeat packets.

In order to overcome the split brain state, one of the nodes must be interrupted and transitioned to a standby type. However since there is an interruption of transactions or calls of another node or terminal receiving a service connected to a node whose service is stopped, service is affected. Thus it is necessary to provide a method so that the cluster system is restored to a normal state (that is, a state where one node is operating as an in-use type node, and the other as a standby type node), while curbing effects on service.

(2-2) A Case where Only a One-Directional Heartbeat Packet from an in-Use Type to a Standby Type is Interrupted (Timed Out), and a Heartbeat Packet in the Opposite Direction is Delivered The standby type node recognizes that a failure has occurred in a corresponding node (in-use type), and starts operating as an in-use type (that is, both nodes are in an in-use type state). However, in this case, by the original in-use type node referring to heartbeat packets, it is possible to comprehend that the original standby type node has started operating as an in-use type.

At this stage, only an original in-use type node that comprehends that both nodes are performing in-use type operations has the ability to overcome a split brain state by transitioning itself to standby type. However, at a stage directly after the original standby type node has started operating as an in-use type (has executed failover), most transactions or call sessions held in the system exist at the original in-use type node. Conversely, almost no transactions or call sessions exist directly after failover on the original standby type node side that has newly started operation as an in-use type. Here, in a case where heartbeat packets from the original in-use type to the original standby type being interrupted is a temporary network problem, it is possible that delivery of heartbeat packets directly after failover occurs will recover (it is to be noted that if heartbeat packets from the original in-use type to the original standby type recover, the original standby type node that has just started in-use type operation may detect that the system is in a split brain state and may again transition itself to standby type).

From the above, in a case where the original in-use type node comprehends, via heartbeat packets, that a corresponding node (original standby type) has started operation as an in-use type, overcoming a split brain by promptly stopping operation of the original in-use type node as an in-use type and transitioning to a standby type, cannot necessarily be said to be suitable. This is because, according to the operation in question, there is a risk that the impact on service being executed may increase. That is, this is because if the original in-use type node immediately transitions to a standby type, most transactions and calls held by the original in-use type node will be cancelled, and there will be a large effect on service.

Therefore, in a case where the original in-use type node detects, via heartbeat packets, that a corresponding node (original standby type) has started operation as an in-use type node, there is a need to provide a method to recover the system to a normal state (operation of original in-use type/standby type) while curbing effects on service.

Prior art related to the abovementioned first and second problems is known. Patent Literature 1 discloses a technology related to the first problem (that is, the occurrence of split brain due to nondelivery of heartbeat packets due to a network failure). However, Patent Literature 1 does not assume a state using a single communication path for exchanging heartbeat packets, as in the present invention (for example, a case where a plurality of communication paths between sites as in a geographically redundant configuration cannot be ensured, or a case where a disaster occurs where a plurality of communication paths exist, but some of communication paths cannot be used).

As a technology for overcoming the first problem, the following technology is known. That is, a technology is known that uses information not only of heartbeat packets between 2 nodes, but also from a third server apparatus (Witness server apparatus), in order to accurately comprehend the state of a corresponding node within a cluster system. Specifically, in a case where heartbeat packets from a corresponding in-use type node are interrupted, failover processing is executed, as long as information obtained from the Witness server apparatus indicates that a failure is occurring at a corresponding in-use type node. However, according to the method in question, it is necessary to additionally dispose the third server apparatus inside the system, and there is a risk of costs increasing. In particular for a geographically redundant configuration, in order that the third server apparatus realizes the abovementioned object, there is a problem in that it is necessary to dispose the third server apparatus at another third side separate from the site at which both nodes are arranged, and constraints increase. Therefore, according to the technology using the third server apparatus (Witness server apparatus), it is not possible to autonomously avoid a split brain based only on exchange of heartbeat packets between 2 nodes within a cluster system.

Patent Literature 2 discloses technology related to the second problem (the problem where a service being executed is affected after the split brain occurs). However, the technology described in Patent Literature 2 is one in which processing is executed within a time for which respective nodes are assigned. Therefore, the technology in question continuously holds call information in the same node, while a call is connected as in a telecommunication system, and is not suitable to a system where it is necessary to continue processing related to the call.

While Patent Literature 3 discloses a split brain recovery system, according to the system in question, at a time of a split brain occurrence, when the system is returned to a normal state, it is not possible to suppress effects on services being executed.

Additionally, the technology described in Patent Literature 4 discloses general operations of failover in a cluster system having redundant functions. That is, the technology in question does not contribute anything such that erroneous failover (or split brain) due to unstable operations, congestion, failure or the like of a heartbeat communication network, does not occur.

Therefore, it is a problem to prevent a reduction in service due to a communication failure of heartbeat packets in a cluster system. It is an object of the present invention to provide a server apparatus, a cluster system, a cluster control method and a program, which contribute to solving the problem in question. It is to be noted that other problems and solution means will become apparent in the description of example embodiments described later.

A server apparatus according to a first aspect of the present invention is one server apparatus (a first server apparatus) in a cluster system having two server apparatuses that operate as an in-use type or a standby type. The server apparatus (the first server apparatus) is provided with a heartbeat transmission/reception part that transmits and receives a heartbeat packet to and from a corresponding server apparatus (a second server apparatus). The server apparatus (the first server apparatus) is provided with a corresponding node monitoring part that adjusts a timeout period for transitioning operation of the server apparatus itself (that is, the first server apparatus) from a standby type (mode) to an in-use type (mode), according to reception state of the heartbeat packet.

A cluster system according to a second aspect of the present invention is provided with the first server apparatus according the first aspect as one of 2 server apparatuses operating as an in-use type or a standby type.

A cluster control method according a third aspect of the present invention is a cluster control method by one server apparatus (a first server apparatus) in a cluster system having two server apparatuses that operate as an in-use type or a standby type. The cluster control method includes transmitting and receiving a heartbeat packet to or from a corresponding server apparatus (a second server apparatus). The cluster control method includes adjusting a timeout period for transitioning an operation of the server apparatus itself (the first server apparatus) from a standby type to an in-use type according to a reception state of the heartbeat packet.

A program according a fourth aspect of the present invention causes a computer to execute processings, the computer being provided in one server apparatus (a first server apparatus) in a cluster system having two server apparatuses that operate as an in-use type or a standby type. The program causes execution of processing of transmitting or receiving a heartbeat packet to or from a corresponding server apparatus (a second server apparatus). The program causes execution of processing of adjusting a timeout period for transitioning an operation of the server apparatus itself (the first server apparatus) from a standby type to an in-use type according to a reception state of the heartbeat packet. It is to be noted that the program may be provided as a program product recorded in a non-transitory computer-readable storage medium.

According to the server apparatus, the cluster system, the cluster control method and the program according to the present invention, it is possible to prevent a reduction in service due to a communication failure of a heartbeat packet in a cluster system. That is, the present invention transforms a cluster system indicated in the background technology into a cluster system that dramatically improves reliability and availability thereof.

PREFERRED MODES

Figure 1:
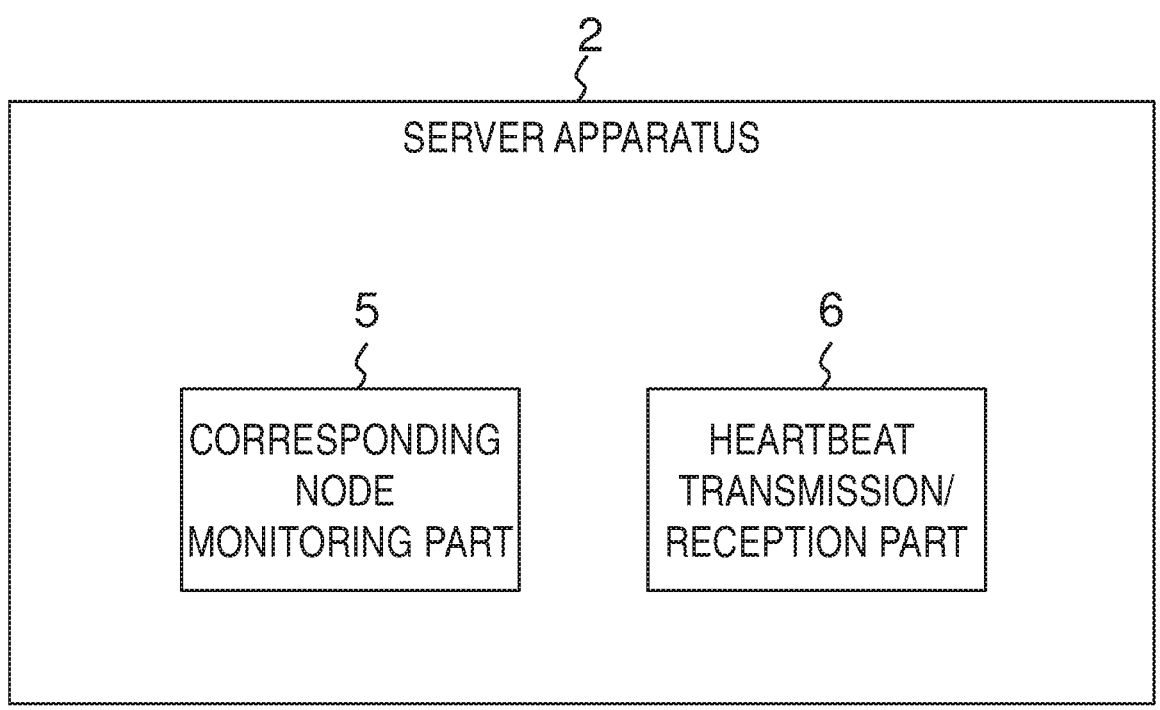
FIG. 1 is a block diagram showing an example of a configuration of a server apparatus according to an example embodiment.

First, a description is given concerning an outline of an example embodiment. It is to be noted that reference symbols in the drawings attached to this outline are examples for the purpose of aiding understanding, and are not intended to limit the present invention to modes illustrated in the drawings. Connection lines between blocks in the diagrams used in the following description may be unidirectional or bidirectional. Unidirectional arrows schematically show flow of main signals (data), but do not exclude directionality.

FIG. 1 is a block diagram showing an example of a configuration of a server apparatus 2 according to an example embodiment. The server apparatus 2 is one server apparatus (2A or 2B) in a cluster system 1 (FIG. 2) provided with 2 server apparatuses 2A, 2B that operate as an in-use type or a standby type. Referring to FIG. 1, the server apparatus 2 is provided with a heartbeat transmission/reception part 6 that transmits and receives a heartbeat packet to and from a corresponding server apparatus, and a corresponding node monitor part 5 that adjusts a timeout period for transitioning operation of the server apparatus itself from a standby type to an in-use type, in accordance with a reception state of the heartbeat packet.

According to the server apparatus 2 in question, the corresponding node monitoring part 5 can extend the timeout period in response to the reception state of the heartbeat packet (for example, a case where a heartbeat packet is dropped, or a case where delay time until a heartbeat packet is received is greater than or equal to a prescribed threshold). Therefore, according to the server apparatus 2 in question, in a cluster system 1 it is possible to reduce the probability of occurrence of a split brain due to a communication failure of a heartbeat packet, and to prevent a deterioration in service due to a split brain.

Figure 2:
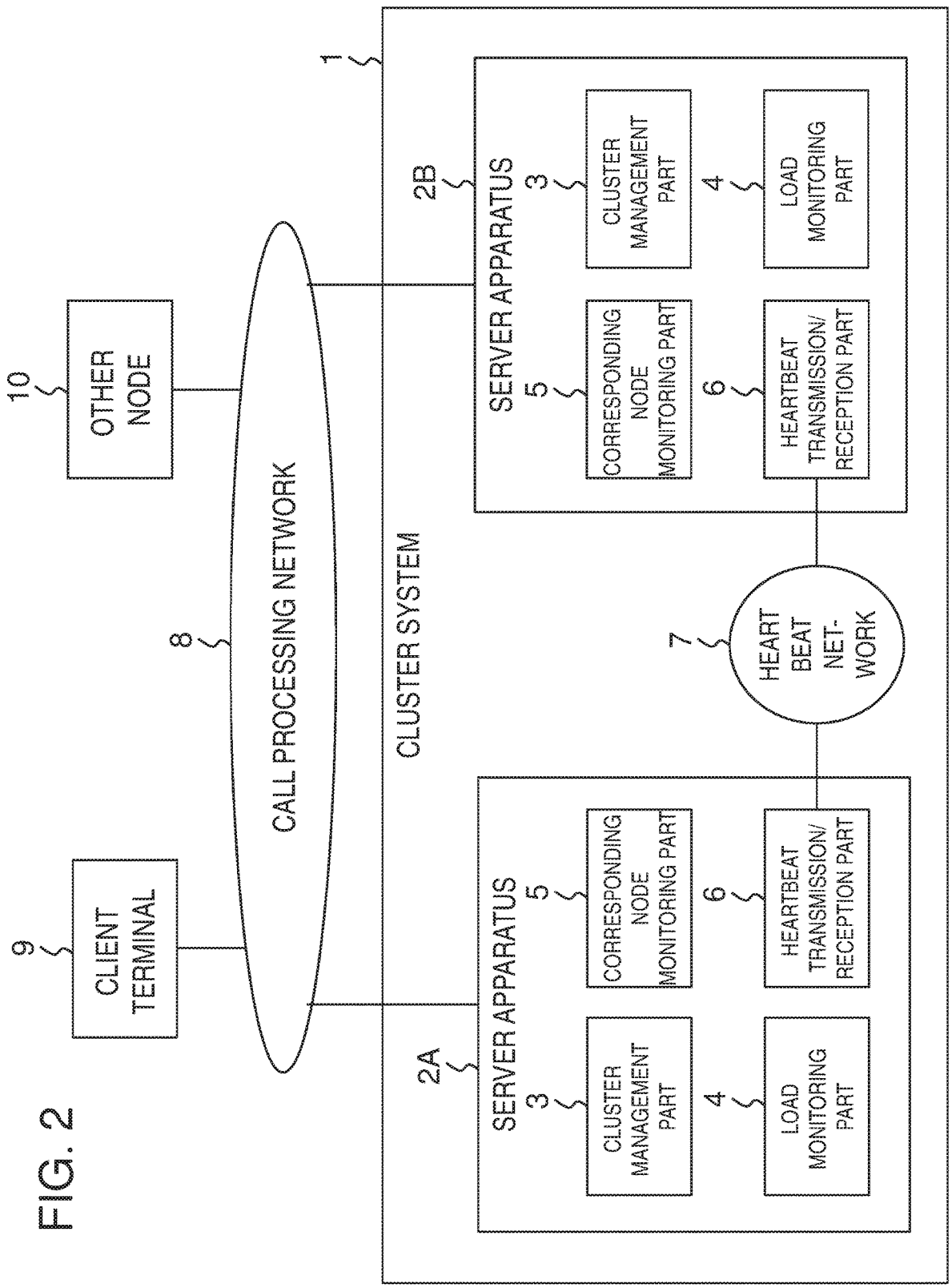
FIG. 2 is a block diagram showing an example of a configuration of a cluster system according to an example embodiment.
Figure 7:
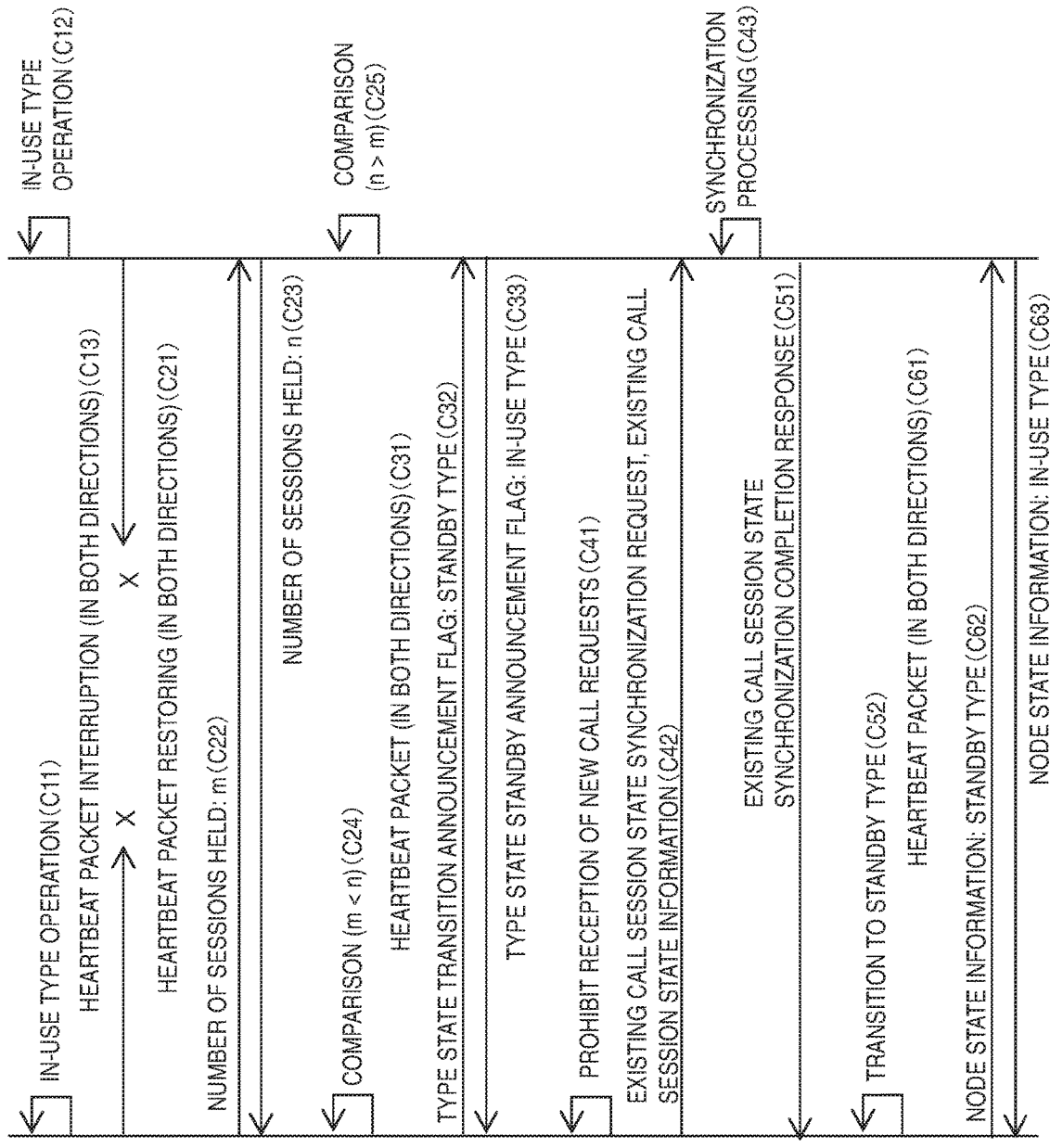
FIG. 7 is a sequence diagram showing an example of operations of the cluster system according to the second example embodiment.

Next, a description is given concerning another configuration of an example embodiment. Referring to FIG. 2, the server apparatus 2 is provided with a cluster management part 3 that compares the number of sessions held by the server apparatus itself and the number of sessions held by a corresponding server apparatus, and determines whether to maintain operation of the server apparatus itself as an in-use type, or to cause a transition to a standby type. Here, the cluster management part 3 (for example, the cluster management part 3 of the server apparatus 2B), in a case where, after the occurrence of a split brain (for example, steps C11, C12 in FIG. 7), the number of sessions (n) held by the server apparatus (2B) itself is larger than the number of sessions (m) held by the corresponding server apparatus (2A) (n>m), maintains operation of the server apparatus (2B) itself as an in-use type, without change (FIG. 7, steps C25, C32).

According to the server apparatus 2 in question, in order to overcome the split brain, when one node is transitioned to a standby type, it is possible to maintain the node with a relatively larger number of sessions as an in-use type, without change. Therefore, according to the server apparatus 2 in question, it is possible to restore the cluster system 1 from a split brain state to a normal state, while curbing effects on service.

Figure 8:
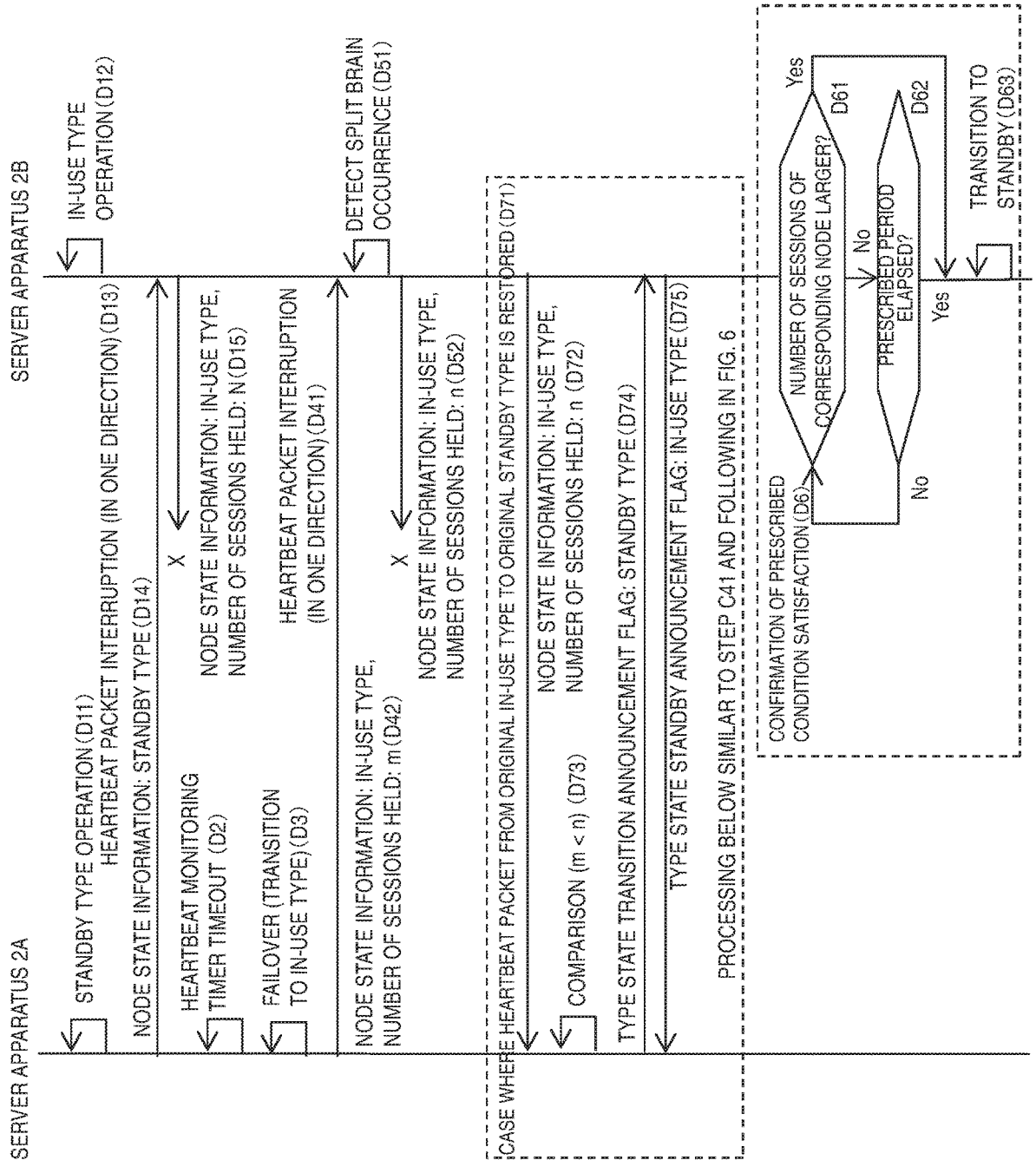
FIG. 8 is a sequence diagram showing an example of operations of the cluster system according to the third example embodiment.

Only heartbeat packets from the server apparatus (2B) that is an in-use type to the server apparatus (2A) that is a standby type are interrupted (FIG. 8, step D14), and a split brain may occur (for example, FIG. 8, step D3). In this case, for the cluster management part 3 (cluster management part 3 of server apparatus 2B), in a case where the number of sessions (m) held by the corresponding server apparatus (2A) is larger than the number of sessions (n) held by the server apparatus (2B) itself (FIG. 8. Yes in step D61), or in a case where a prescribed period has passed from comprehending that the corresponding server apparatus (2A) has started in-use type operation (FIG. 8, step D51) (FIG. 8, yes in step D62), operations of the server apparatus (2B) itself may be transitioned to a standby type (FIG. 8, step D63), and in cases otherwise, operations of the server apparatus itself may be maintained as an in-use type, without change.

According to the server apparatus 2, in a case where only a heartbeat from an in-use type to a standby type is interrupted and a split brain occurs, heartbeat communication thereafter is not restored and synchronization of data cannot be executed, it is possible to curb effects on service. A reason for this is because, instead of a node that detects a split brain occurrence (that is, original in-use type node) transitioning to a standby type immediately, transitioning to a standby type is done after waiting until a prescribed condition is satisfied.

First Example Embodiment

Next, a description is given concerning a cluster system according to a first example embodiment, making reference to the drawings. The cluster system of the present example embodiment has an object of overcoming the first problem as described above. That is, the cluster system of the present example embodiment has an object of preventing the occurrence of failover (split brain) due to mistaking a corresponding node failure due to a temporary heartbeat packet interruption or delay due to unstable operation of a network.
<Configuration>

First, a description is given concerning a configuration of the cluster system of the present example embodiment, making reference to the drawings. Here, the cluster system has an ACT-SBY (Active-Standby type) configuration as an example. FIG. 2 is a block diagram showing an example of a configuration of the cluster system 1 according to the present example embodiment. It is to be noted that FIG. 2 shows at the same time a terminal 9 and another node 10 that access the cluster system 1 via a call processing network 8.

Referring to FIG. 2, the cluster system 1 is provided with the server apparatuses 2A and 2B connected via a heartbeat network 7. The server apparatuses 2A and 2B are normally arranged at the same site. In normal operation, one among the server apparatuses 2A and 2B operates as an in-use type, and the other operates as a standby type. Below, where there is no need to distinguish between the server apparatuses 2A and 2B, they are generically termed server apparatus 2.

The server apparatus 2 operating as an in-use type activates a floating IP (Internet Protocol) address, and performs communication with a client terminal 9 or another call processing node (another node 10 in FIG. 2) via a call processing network 8.

Referring to FIG. 2, the server apparatuses 2A and 2B are each provided with a cluster management part 3, a load monitoring part 4, a corresponding node monitoring part 5, and a heartbeat transmission/reception part 6.

The heartbeat transmission/reception part 6 reciprocally transmits and receives heartbeat packets to and from a corresponding node. The heartbeat transmission/reception part 6 of each server apparatus 2 transmits heartbeat packets to a partner node periodically via the heartbeat network 7.

The cluster management part 3 manages cluster state (in-use type/standby type) of the node itself. The cluster management part 3, in a case with the node itself in a standby type state, where heartbeat packets from a corresponding node (in-use type) are timed out, activates failover processing to switch the node itself to in-use type operation.

The load monitoring part 4 monitors load state (for example, CPU (Central Processing Part) utilization) of the node itself.

A corresponding node monitoring part 5 monitors the state of a corresponding node, based on heartbeat packets received from the corresponding node. The corresponding node monitoring part 5 adjusts a timeout period for transitioning operations of the server apparatus itself from standby type to in-use type, in response to a heartbeat packet reception state. The corresponding node monitoring part 5, in a case where a heartbeat packet is dropped, or a case where delay time until a heartbeat packet is received is greater than or equal to a prescribed threshold, extends the timeout period. Additionally, the corresponding node monitoring part 5, in a case where the load of the corresponding server apparatus 2 is less than or equal to a prescribed threshold, may extend the timeout period.

Figure 3:
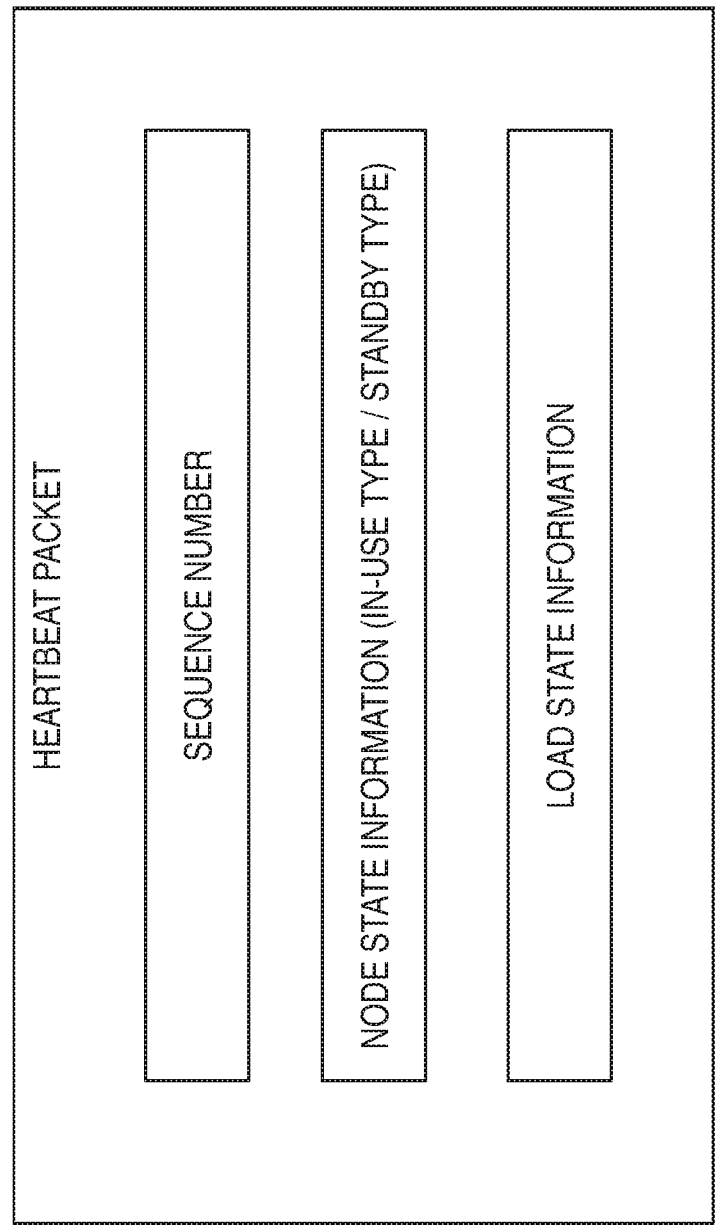
FIG. 3 is a diagram showing an example of a configuration of a heartbeat packet according to a first example embodiment.

FIG. 3 is a diagram showing an example of a configuration of a heartbeat packet. Referring to FIG. 3, the heartbeat packet includes a "sequence number", "node state information (in-use type/standby type)", and "load state information". The "sequence number" is an integer updated (for example, incremented or decremented) for each heartbeat packet transmission. The "node state information (in-use type/standby type)" is a value representing a cluster state (in-use type/standby type) of the node itself. The "load state information" is a value representing load state (CPU utilization or the like) of the node itself.

The heartbeat transmission/reception part 6 updates the "sequence number" for each heartbeat packet transmission to be set in the heartbeat packet. The heartbeat transmission/reception part 6 obtains cluster state (in-use type/standby type) of the node itself from the cluster management part 3 to be set in the "node state information" of the heartbeat packet. The heartbeat transmission/reception part 6 obtains the load state of the node itself from the load monitoring part 4 to be set in the "load state information" of the heartbeat packet.
<Operation>

Figure 4:
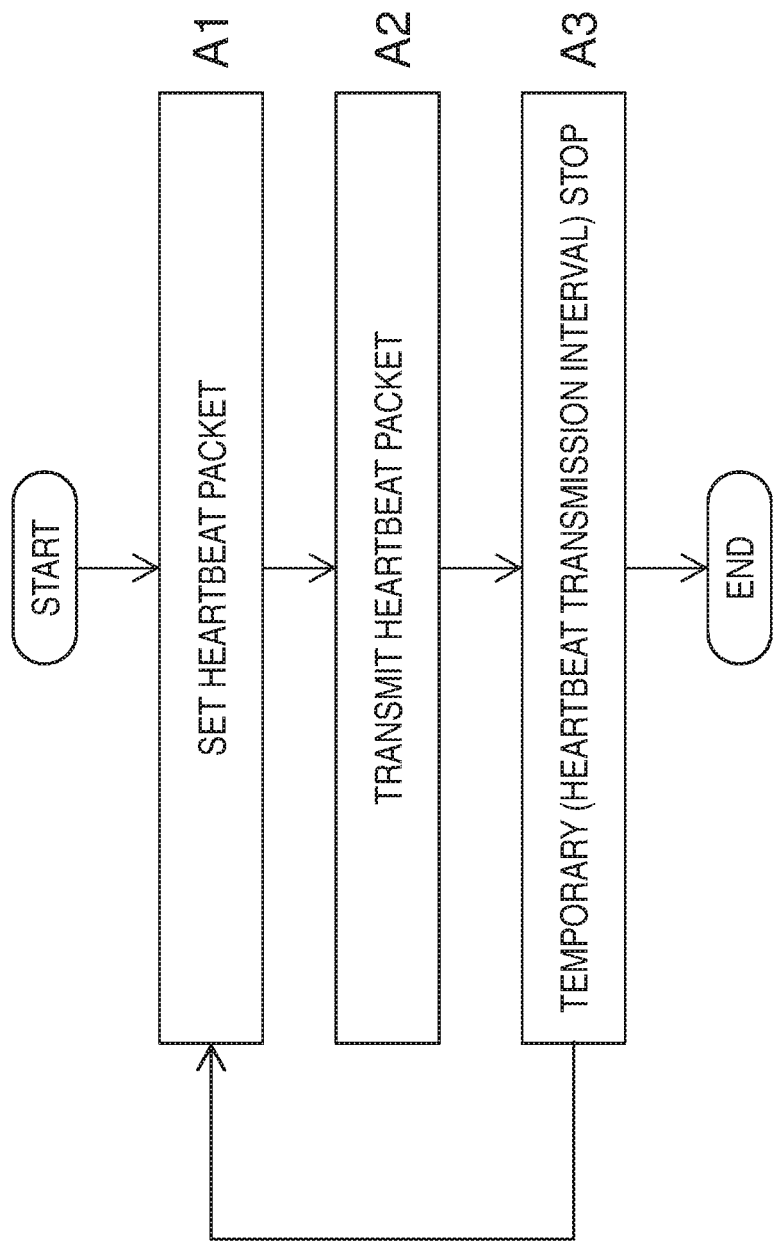
FIG. 4 is a flow diagram showing an example of operations of a server apparatus on a heartbeat packet transmission side according to a first example embodiment.

Next, a description is given concerning operations of the cluster system 1 of the present example embodiment, making reference to the drawings. FIG. 4 is a flow diagram showing an example of operations of a heartbeat transmission side node.

Referring to FIG. 4, the heartbeat transmission/reception part 6 of the server apparatus 2 on a side transmitting a heartbeat packet sets information shown in FIG. 3 in a heartbeat packet to be transmitted (step A1).

The heartbeat transmission/reception part 6 transmits a heartbeat packet created in step A1 towards the heartbeat transmission/reception part 6 of the corresponding node via a heartbeat network 7 (step A2).

The heartbeat transmission/reception part 6 returns to setting of a heartbeat packet, after temporarily stopping processing (step A3) for a predetermined heartbeat transmission interval (for example, 1 second) (step A1). Below, the heartbeat transmission/reception part 6 repeats similar processing.

Figure 5:
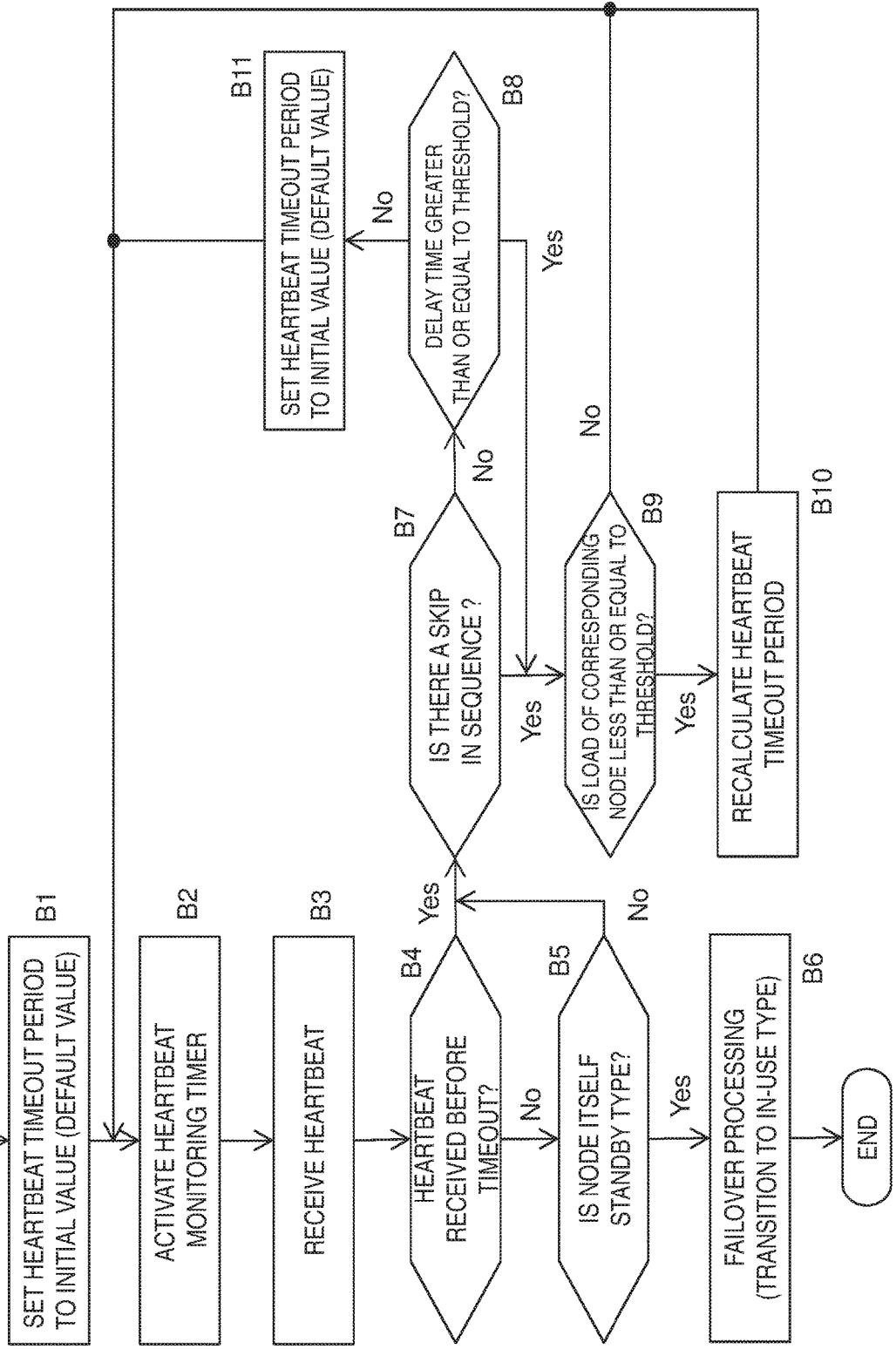
FIG. 5 is a flow diagram showing an example of operations of a server apparatus on a heartbeat packet receiving side according to the first example embodiment.

FIG. 5 is a flow diagram showing an example of operations of a node on a heartbeat receiving side. When a server apparatus of a standby type performs state monitoring of an server apparatus of an in-use type by using a heartbeat packet transmitted from a server apparatus of an in-use type, normally a state timeout period of heartbeat interruption (that is, a period until a failure is determined) is set to a fixed value (for example, 3 seconds). On the other hand, in the present example embodiment, the corresponding node monitoring part 5 dynamically changes the timeout period in response to packet dropping (loss) or a tendency for delay (for example, statistical behavior).

The corresponding node monitoring part 5 of the server apparatus 2 holds a variable representing a heartbeat timeout period. The corresponding node monitoring part 5 sets a default value (for example, 3 seconds) at system startup time to the variable in question (step B1).

The corresponding node monitoring part 5 activates a heartbeat monitoring timer (step B2).

Next, the heartbeat transmission/reception part 6 starts receiving heartbeat packets from a corresponding node (step B3).

The corresponding node monitoring part 5 confirms whether or not a heartbeat packet has been received from a corresponding node before the heartbeat monitoring timer times out (step B4).

In a case of not receiving a heartbeat packet before timeout (No in step B4), the corresponding node monitoring part 5 reads the state (in-use type or standby type) of the node itself from the cluster management part 3, and determines whether or not the node itself is of a standby type (step B5).

In a case where the state of the node itself is a standby type (Yes in step B5), the cluster management part 3 executes failover processing, and transitions the node itself to an in-use type (step B6).

On the other hand in a case of receiving a heartbeat before timeout (Yes in step B4), or in a case where the state of the node itself is not of standby type (No in step B5), the corresponding node monitoring part 5 reads a sequence number in the received heartbeat packet. In this way, the corresponding node monitoring part 5 confirms whether or not a sequence number has skipped (that is, there is a heartbeat packet that has not arrived) (step B7).

In a case where there is a skip in sequence number (Yes in step B7), processing of the corresponding node monitoring part 5 proceeds to step B9. On the other hand, in a case where there is no skip with regard to sequence number (No in step B7), processing of the corresponding node monitoring part 5 proceeds to step B8.

The corresponding node monitoring part 5 confirms time of arrival of a received heartbeat packet (step B8). In a case where delay time from average arrival interval is greater than or equal to a predetermined threshold (Yes in step B8), the corresponding node monitoring part 5 proceeds to step B9.

The corresponding node monitoring part 5 reads load state information (FIG. 3) in the received heartbeat packet, and confirms whether or not a load state of a corresponding node (for example, CPU utilization or the like) is less than or equal to a predetermined threshold (step B9). In a case where the load of the corresponding node exceeds the threshold (No in step B9), the corresponding node monitoring part 5 determines that the observed heartbeat packet dropping (sequence number skipping) or heartbeat packet arrival delay is not a phenomenon due to the network, but is due to high load of the corresponding node. At this time, the corresponding node monitoring part 5 does not perform recalculation (change) of heartbeat timeout period, but returns to heartbeat monitoring timer activation processing (step B2), and monitors the next heartbeat packet.

On the other hand, in a case where the load of a corresponding node is less than or equal to a threshold (Yes in step B9), the corresponding node monitoring part 5 determines that the observed heartbeat packet dropping (sequence number skipping) or heartbeat packet arrival delay is not due to a high load on the corresponding node, but is due to network congestion, unstable operation, failure or the like. At this time, in order to prevent a mistaken failover, the corresponding node monitoring part 5 performs recalculation so as to lengthen the heartbeat timeout period (step B10).

The corresponding node monitoring part 5 calculates the heartbeat timeout period using, for example, the following formula (1).

$$\text{heartbeat timeout period(s)} = \text{heartbeat timeout period default value(s)} + \{\alpha \times \text{number of continuous heartbeat packets dropped (number of sequence numbers skipped)}\} + \{\beta \times \text{heartbeat packet arrival delay time(s)}\} \quad (1)$$

Here, $\alpha$ and $\beta$ are parameters set in the system in advance.

When the corresponding node monitoring part 5 recalculates the heartbeat timeout period (step B10), it returns to the heartbeat monitoring timer activation processing (step B2), and monitors the next heartbeat packet using a new heartbeat timeout period.

Meanwhile, as a result of confirming the arrival time of the received heartbeat packet, in a case where the delay time from the average arrival interval is shorter than a preset threshold (No in step B8), the corresponding node monitoring part 5 judges that the network state has returned to normal. At this time, the corresponding node monitoring part 5 overwrites the heartbeat timeout period with an initial value (default value) (step B11), returns to heartbeat monitoring timer activation processing (step B2), and monitors the next heartbeat packet.

<Effect>

In the cluster system of the present example embodiment, tendency for received heartbeat packet dropping or delay is monitored, and if observed, the network is regarded as being in an unstable state and recalculation is performed to lengthen heartbeat timeout period. According to the configuration in question, it is possible to prevent the occurrence of erroneous failover due to unstable operation, congestion or failure of a heartbeat communication path network (occurrence of split brain due to these).

That is, according to the cluster system according to the present example embodiment, in a cluster system configured by 2 nodes, in a case of interruption of heartbeat delivery due to network instability or failure irrespective of whether an in-use type node is operating normally, it is possible to reduce the probability of a phenomenon occurring in which a standby type node erroneously recognizes a corresponding node failure and starts operating as an in-use type, and both nodes operate as an in-use type (split brain). At this time, it is also possible to avoid a situation of affecting provision of service due to split brain.

Second Example Embodiment

Next, a description is given concerning a cluster system according to a second example embodiment, making reference to the drawings. The cluster system of the present example embodiment has an object of overcoming the second problem as described above that occurs in a case where a heartbeat packet interruption (timeout) is in both directions between an in-use type and a standby type, and thereafter the heartbeat packets are restored in both directions. That is, in a case where heartbeat packets are interrupted in both directions and a split brain occurs, it is an object of the present example embodiment to restore the cluster system to a normal state while curbing the effect on service. It is to be noted that, as a case where a split brain occurs as in the present example embodiment, for example, a case may be considered where for a standby type node, heartbeat packets from an in-use type are interrupted so that there is a timeout and a failover occurs, but in actuality a temporary network interruption is the cause, and the original in-use type node continues operations as an in-use type.

When bidirectional heartbeat packet communication is restored from a state in which the heartbeat packets are interrupted, in order to overcome the split brain, it is necessary to stop service of a server apparatus and transition to a standby type. However, when service of simply one node is interrupted, there is a risk of cutting off transactions or calls of a client terminal 9 or other node 10 that is connected to that node and is receiving a service, and of the service being affected.

Thus it is desirable to transition the cluster system to a normal state (operating as in-use type/standby type), while curbing effects on service. Thus, in the present example embodiment, the following processing is executed with regard to both server apparatuses 2, each operating as an in-use type in a split brain state. That is, after restoring communication of heartbeat packets in both directions, both server apparatuses 2 mutually exchange information concerning the number of transactions or sessions held by the nodes themselves at that point in time, using the heartbeat packets. The server apparatus 2 with a smaller number of transactions or sessions held, transitions to a standby type after information on sessions being held is synchronized with the other server apparatus 2. Below, a description is given concerning a specific configuration.

<Configuration>

A configuration of the cluster system of the present example embodiment is the same as the configuration of the cluster system 1 (FIG. 2) of the first example embodiment. Below, the description is centered on differences between the present example embodiment and the first example embodiment.

In the present example embodiment, the cluster management part 3 compares the number of sessions held by the server apparatus itself and the number of sessions held by a corresponding server apparatus, to determine whether to maintain operation of the server apparatus itself as an in-use type, or to cause a transition to standby. The cluster management part 3, for example, in a case where the number of sessions held by the server apparatus itself is larger than the number of sessions held by a corresponding server apparatus, maintains operation of the server apparatus itself as an in-use type without change, and in other cases causes transition of operation of the server apparatus itself to standby.

Figure 6:
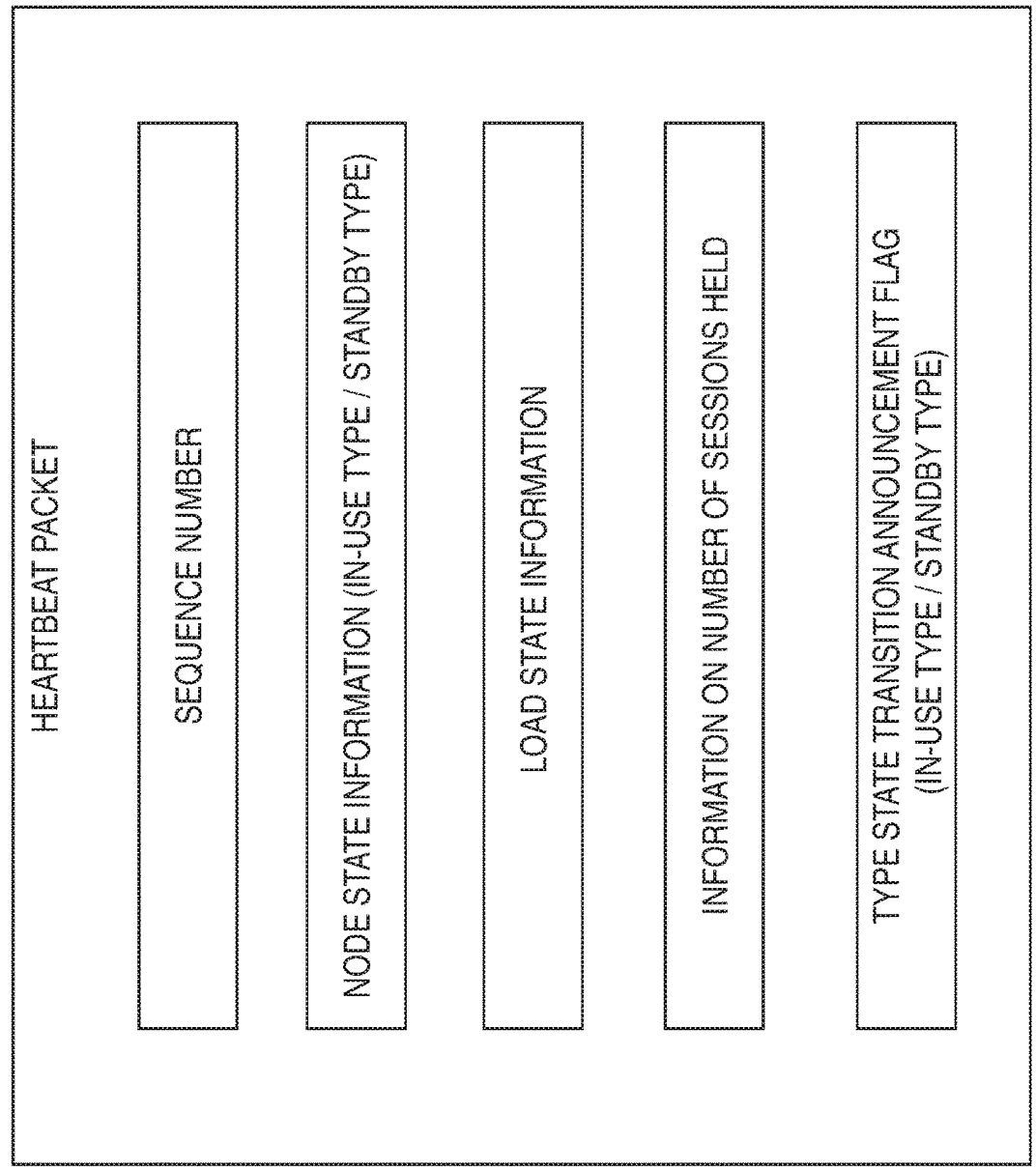
FIG. 6 is a diagram showing an example of a configuration of a heartbeat packet according to second and third example embodiments.

FIG. 6 is a diagram showing an example of a configuration of a heartbeat packet according to the present example embodiment. Referring to FIG. 6, the heartbeat packet of the present example embodiment additionally includes "information on number of sessions held" and "type state transition announcement flag (in-use type/standby type)", in addition to information held by the heartbeat packet (FIG. 3) of the first example embodiment. The "information on number of sessions held" is information indicating the number of sessions held by the node itself. On the other hand, the "type state transition announcement flag (in-use type/standby type)" is a flag for notifying a partner node that the node itself is transitioning to an in-use type/standby type.

In the present example embodiment, the heartbeat transmission/reception part 6 sets the number of sessions held by the node itself as "information on number of sessions held" in a heartbeat packet. The heartbeat transmission/reception part 6, in a case where the cluster management part 3 determines that the state of the node itself is being transitioned to an in-use type/standby type, sets information indicating the state (in-use type/standby type) of the transition destination of the node itself as "type state transition announcement flag (in-use type/standby type)" in a heartbeat packet.

<Operation>

FIG. 7 is a sequence diagram showing an example of operations of the cluster system 1 in the present example embodiment.

Referring to FIG. 7, a split brain occurs where both the server apparatuses 2A and 2B perform an in-use type operation (steps C11 and C12). Heartbeat packets between the two nodes are interrupted in both directions, due to congestion, unstable operations, failure and the like, of a heartbeat network 7 (step C13).

Here, when the heartbeat network 7 is restored (step C21), both nodes receive heartbeat packets from a partner node (step C22, C23). The received heartbeat packets, as shown in FIG. 6, include information related to the number of sessions held by the partner node (that is, another node that transmits that heartbeat packet). On receiving a heartbeat packet, the cluster management part 3 of each node compares the number of sessions of the partner node and the number of sessions held by the node itself (step C24, C25). Here, the numbers of sessions respectively held by the server apparatuses 2A and 2B are m and n.

The cluster management part 3, in a case where the number of sessions of the node itself is less than the number of sessions of a partner node, determines a transition to a standby type. At this time, the heartbeat transmission/reception part 6 uses the "type state transition announcement flag" (FIG. 6) within a heartbeat packet to notify the partner node that the node itself will transition to a standby type (step C32). On the other hand, the cluster management part 3, in a case where the number of sessions of the node itself is larger than those of the partner node, determines to continue operation of the in-use type. At this time, the heartbeat transmission/reception part 6 uses the "type state transition announcement flag" (FIG. 6) within the heartbeat packet, to notify the partner node that the node itself will continue as an in-use type (step C33).

The server apparatus 2A, in a case of selecting that the node itself be transitioned to a standby type, confirms the "type state transition announcement flag" included in the heartbeat packet received from the partner node (server apparatus 2B). In a case where the "type state transition announcement flag" indicates that the partner node (server apparatus 2B) will continue as an in-use type, the server apparatus 2A first stops reception of new call requests to the node itself. Data related to session states of existing calls held within the node itself, is forwarded to a corresponding node (server apparatus 2B that continues in-use type operation) via the heartbeat network 7 (step C42).

Here, data related to session state, in a case where the server apparatus 2 is a call processing server apparatus, is data necessary for continuing call processing. The data in question is represented, for example, by a set of source telephone number (or user name), destination telephone number (or user name), session ID (Identifier), session timer value, billing information, and the like.

When forwarding of data related to session state is completed, and a response of synchronization completed is received from a corresponding node (that is, the server apparatus 2B that continues an in-use type operation) (step C51), the cluster management part 3 of the server apparatus 2A causes the node itself to transition to a standby type (step C52).

Thereafter, "standby type" is set in node state information (FIG. 6) within a heartbeat packet transmitted from the server apparatus 2A (that is, a node transitioned to standby type) (step C62). In this way, the server apparatus 2B (that is, the node continuing an in-use type operation) confirms that the corresponding node has transitioned to a standby type. Similarly, "in-use type" is set in node state information (FIG. 6) within a heartbeat packet transmitted from the server apparatus 2B (that is, a node transitioned to an in-use type (step C63). In this way, the server apparatus 2A (that is, the node that continues a standby type operation) comprehends that the corresponding node performs an in-use type operation.

<Effect>

In the cluster system of the present example embodiment, even in a case where a split brain occurs, when thereafter communication in both directions between the nodes is restored and synchronization of data is possible, processing to synchronize existing call session state information on the node transitioned to a standby type is executed, and with the state being entirely continued, a transition operation to a standby type is executed.

That is, in the present example embodiment, with synchronization of existing call session state information between both nodes performed, one of the nodes is transitioned to a standby type, and a normal in-use type/standby type operation state is restored. In this way, even in a case where a split brain occurs, the cluster system can be restored to a normal in-use type/standby type operation state, while curbing effects on service.

In the present example embodiment, in order to overcome the split brain, when one node is transitioned to a standby type, the node with a relatively larger number of sessions is maintained as an in-use type, without change. Therefore, according to the present example embodiment, it is possible to restore the cluster system from a split brain state to a normal state, while curbing effects on service.

Third Example Embodiment

Next, a description is given concerning a cluster system according to a third example embodiment, making reference to the drawings. The cluster system of the present example embodiment has an object of overcoming the second problem as described above that occurs in a case where a heartbeat packet interruption (timeout) is in one direction only from an in-use type to a standby type, and the heartbeat is delivered in the opposite direction. That is, in a case where heartbeat packets are interrupted (timed out) only in one direction from an in-use type to a standby type and a split brain occurs, it is an object of the present example embodiment to restore the cluster system to a normal state while curbing the effect on service.

In this case, the standby type node recognizes that a failure has occurred in a corresponding node (in-use type), and starts operating as an in-use type. The original in-use type node can know that the original standby type node has started operation as an in-use type, via a heartbeat packet. Normally, the original in-use type node, knowing that the split brain state has occurred, stops operation as an in-use type and transitions to standby type, to overcome this state. However, due to this, there is a risk of cutting off transactions or calls of another node or terminal connected to the original in-use type node, and service being affected. Therefore, in the present example embodiment, by employing the following configuration and operation, the effect on service is curbed.

<Configuration>

A configuration of the cluster system of the present example embodiment is the same as the configuration (FIG. 2) of the cluster system 1 in the first and second example embodiments. A configuration of a heartbeat packet of the present example embodiment is the same as the configuration (FIG. 6) of the heartbeat packet in the second example embodiment. Below, the description is centered on differences between the present example embodiment and the second example embodiment.

In the present example embodiment, in a case where the number of sessions held by a corresponding server apparatus is larger than the number of sessions held by the server apparatus itself, or in a case where a prescribed period has elapsed from comprehending that the corresponding server apparatus has started in-use type operation, the cluster management part 3 causes transition of operation of the server apparatus itself to standby. On the other hand, in other cases, the cluster management part 3 maintains operation of the server apparatus itself as an in-use type, without change.

<Operation>

FIG. 18 is a sequence diagram showing an example of operations of the cluster system 1 according to the present example embodiment.

Referring to FIG. 8, the server apparatus 2A performs standby type operations (step D11), while the server apparatus 2B performs in-use type operations (step D12). At this time, the cluster system 1 operates normally. Here, only heartbeat packets from the server apparatus 2B (in-use type) to the server apparatus 2A (standby type) are interrupted, due to congestion, unstable operation, failure or the like, of a heartbeat network 7 (steps D13 to D15).

In the corresponding node monitoring part 5 of the server apparatus 2A (standby type), a heartbeat monitoring timer times out (step D2).

The cluster management part 3 of the server apparatus 2A (standby type) executes failover processing, and transitions the node itself to an in-use type (step D3). At this time, a split brain occurs where both of the server apparatuses 2A and 2B perform in-use type operations.

The heartbeat transmission/reception part 6 of the server apparatus 2A (original standby type) sets node state information within the heartbeat packet (FIG. 6) to "in-use type", to be transmitted to the server apparatus 2B (original in-use type) (step D42).

The heartbeat packet communicates from the server apparatus 2A (original standby type) to the server apparatus 2B (original in-use type) (step D41). Therefore, the server apparatus 2B (original in-use type) detects that the server apparatus 2A (original standby type) has started operation as an in-use type (that is, that a split brain has occurred) (step D51). It is to be noted that heartbeat packets from the server apparatus 2B (original in-use type) to the server apparatus 2A (original standby type) are interrupted, without change (step D52).

Here, the server apparatus 2B (original in-use type) instead of promptly stopping operations as an in-use type and transitioning to a standby type, continues operations as an in-use type until a prescribed condition is satisfied (step D6). In a case where the prescribed condition is satisfied, the server apparatus 2B (original in-use type) transitions to a standby type (step D63).

Here, as the prescribed condition, for example, the following condition may be used. That is, the cluster management part 3 of the server apparatus 2B, in a case where either one or both of the following (a) and (b) are satisfied, may transition the node itself to standby type (step D63).

(a) The cluster management part 3 of the server apparatus 2B (original in-use type), in a case where the number of sessions held by a corresponding node (server apparatus 2A, original standby type) is larger than the number of sessions held by the node itself, transitions the node itself to standby type (step D63). Specifically, the server apparatus 2B (original in-use type) carries out the following procedure.

The cluster management part 3 of the server apparatus 2B compares the number (m) of sessions held by the corresponding node (server apparatus 2A, original standby type), included in a heartbeat packet received from the corresponding node (server apparatus 2A, original standby type), with the number (n) of sessions held by the node itself (step D61).

In a case where the number (n) of sessions held by the node itself is less than the number (m) of sessions held by a partner node (n<m) (Yes in step D61), the cluster management part 3 transitions the node itself to a standby type (step D63).

(b) In a case where a prescribed standby type time has elapsed from comprehending (step D51) that the corresponding server apparatus 2A (original standby type) has started operation as an in-use type (Yes in step D62), the cluster management part 3 of the server apparatus 2B transitions the node itself to standby type (step D63).

Here, the prescribed standby time may be specified, for example, by the following method.

fixed value (specified as system set value or the like)
dynamically set from heartbeat packet reception statistical information In a state in which a network is unstable, after a heartbeat packet is interrupted through a relatively long period, there is a tendency for notice of the heartbeat packet to be restored. Therefore, a prescribed standby time may be obtained by multiplying the size of arrival delay time or the number of dropped heartbeat packets received by the server apparatus 2B (original in-use type), by a factor. As an example, the prescribed standby time may be calculated using the following formula (2).

Standby time(s)=α2+{β2×number of continuous heartbeat packets dropped (number of sequence numbers skipped)}+{γ2×heartbeat packet arrival delay time(s)}  (2)

Here, α2, β2 and γ2 are parameters set in the system in advance.

On the other hand, before the condition described in step D6 is satisfied (original an in-use type node transitions to a standby type according to Yes in step D61 or Yes in step D62), in a case where heartbeat communication from the server apparatus 2B (original in-use type) to the server apparatus 2A (original standby type) (step D71), operations similar to step C31 and following in FIG. 7 are executed. That is, the two nodes exchange information related to the number of sessions held by the node itself at that point in time, using a heartbeat packet (step D72). After the node with a smaller number of sessions held transmits existing call session state information held to another node (refer to step C42 in FIG. 7), and receives a synchronization complete response for the session state information (refer to step C51 of FIG. 7), there is a transition to a standby type (refer to step C52 in FIG. 7).

<Effect>

In the cluster system of the present example embodiment, in a case where a split brain occurs due to only a heartbeat packet from an in-use type node to a standby type being interrupted, when heartbeat communication is not restored and data synchronization cannot be executed, the following operations take place. That is, in this case, instead of a node that detects a split brain occurrence (that is, originally an in-use type node) executing an operation of transitioning immediately to a standby type, transition to a standby type is done after waiting until the abovementioned prescribed condition is satisfied. In this way, even in a case where a split brain occurs, the cluster system is restored to an operation state of normal in-use type/standby type, while curbing effects on service.

Modified Example

Various modifications to the cluster system according to the abovementioned example embodiments are possible. As an example, heartbeat packets may be exchanged via a call processing network 8, instead of a heartbeat network 7 dedicated for heartbeats.

As in the abovementioned example embodiments, the present invention may be applied also in a case of a geographical redundant configuration in which 2 server apparatuses in a cluster system are disposed at separate sites, instead of a configuration where the two server apparatuses 2 are disposed in the same site.

In addition, in the abovementioned third example embodiment, the in-use type server apparatus 2B that comprehends that the original standby type server apparatus 2A has started an in-use type operation by referring to a heartbeat packet, continues in-use type operation until a prescribed condition is satisfied (FIG. 8). On the other hand, the original in-use type server apparatus 2B may transition to a suspended state in which processing execution is stopped while holding call or transaction information within the node itself, instead of continuing an in-use type operation.

In a case of satisfying a prescribed condition after transitioning to a suspended state, the original in-use type server apparatus 2B may execute an operation of transitioning to a standby type. Here, for example, heartbeat communication is restored to the original standby type server apparatus 2A from the original in-use type server apparatus 2B before the original in-use type server apparatus 2B transitions to standby type. In this case, the two nodes exchange information related to the number of sessions held by the node itself at the point in time of restoring, using a heartbeat packet. In addition, the server apparatus 2 with a relatively smaller number of sessions transitions to standby type after existing call session state information is synchronized with a corresponding node. Thereafter, operations similar to the third example embodiment may be performed.

In addition, in a case where the original standby type server apparatus 2A transitions once again to a standby type, and the original in-use type server apparatus 2B continues operation as an original in-use type, the following may be performed. That is, the original in-use type server apparatus 2B may transition to a normal operation state from a suspended state by using call or session information held as the suspended state, and continue service processing.

It is to be noted that the following modes are possible in the present invention.

<Mode 1>
As in the server apparatus (first server apparatus) according to the first aspect described above.
<Mode 2>
The first server apparatus according to mode 1, wherein the corresponding node monitoring part, in a case where the heartbeat packet is dropped or a case where delay time until the heartbeat packet is received is greater than or equal to a prescribed threshold, extends the timeout period.

<Mode 3>
The first server apparatus according to mode 2, wherein the corresponding node monitoring part, in a case where the load of the corresponding server apparatus is less than or equal to a prescribed threshold, extends the timeout period.
<Mode 4>
The first server apparatus according to any one of modes 1 to 3, provided with a cluster management part that compares the number of sessions held by the server apparatus itself and the number of sessions held by the corresponding second server apparatus, and determines whether to maintain operation of the server apparatus itself as an in-use type without change, or to cause a transition to a standby type.
<Mode 5>
The first server apparatus according to mode 4, wherein the cluster management part, in a case where the number of sessions held by the first server apparatus is larger than the number of sessions held by the corresponding second server apparatus, maintains operation of the first server apparatus as an in-use type without change.
<Mode 6-1>
The first server apparatus according to mode 4, wherein the cluster management part, in a case where the number of sessions held by the corresponding second server apparatus is larger than the number of sessions held by the server apparatus itself, causes transition of operation of the server apparatus itself to a standby type, and in other cases maintains operation of the first server apparatus as an in-use type without change.
<Mode 6-2>
The first server apparatus according to mode 4, wherein the cluster management part, in a case where a prescribed period has elapsed from comprehending that the corresponding second server apparatus has started operation as an in-use type, causes transition of operation of the first server apparatus to a standby type, and in other cases maintains operation of the first server apparatus as an in-use type without change.
<Mode 7>
The first server apparatus according to any one of modes 1 to 6, wherein the heartbeat transmission/reception part includes a sequence number updated each time the heartbeat packet is transmitted, in the heartbeat packet, to be transmitted to the corresponding second server apparatus.
<Mode 8>
The first server apparatus according to any one of modes 1 to 7, wherein the heartbeat transmission/reception part includes information indicating load of the first server apparatus in the heartbeat packet, to be transmitted to the corresponding second server apparatus.
<Mode 9>
The first server apparatus according to any one of modes 1 to 8, wherein the heartbeat transmission/reception part includes information indicating the number of sessions held by the first server apparatus in the heartbeat packet, to be transmitted to the corresponding second server apparatus.
<Mode 10>
A cluster system provided with the first server apparatus according to any one of modes 1 to 9, as one of 2 server apparatuses operating as an in-use type or a standby type.
<Mode 11>
As in the cluster control method according to the third aspect described above.
<Mode 12>
The cluster control method according to mode 11, wherein, in a case where the heartbeat packet is dropped, or a case where delay time until the heartbeat packet is received is greater than or equal to a prescribed threshold, the timeout period is extended.
<Mode 13>
The cluster control method according to mode 12, wherein, in a case where the load of the second corresponding server apparatus is less than or equal to a prescribed threshold, the timeout period is extended.
<Mode 14>
The cluster control method according to any one of modes 11 to 13, including comparing the number of sessions held by the first server apparatus and the number of sessions held by the corresponding second server apparatus, and determining whether to maintain operation of the first server apparatus as an in-use type without change, or to cause a transition to a standby type.
<Mode 15>
The cluster control method according to mode 14, including, in a case where the number of sessions held by the first server apparatus is larger than the number of sessions held by the corresponding second server apparatus, maintaining operation of the first server apparatus as an in-use type without change.
<Mode 16-1>
The cluster control method according to mode 14, including, in a case where the number of sessions held by the corresponding second server apparatus is larger than the number of sessions held by the first server apparatus, transitioning operation of the server apparatus to standby type, and in other cases, maintaining operation of the first server apparatus as being in-use type without change.
<Mode 16-2>
The cluster control method according to mode 14, including, in a case where a prescribed period has elapsed from comprehending that the corresponding second server apparatus has started operation as an in-use type, transitioning operation of the first server apparatus to a standby type, and in other cases maintaining operation of the first server apparatus as an in-use type without change.
<Mode 17>
As in the program according to the fourth aspect described above.
<Mode 18>
The program according to mode 17, including, in a case where the heartbeat packet is dropped, or a case where delay time until the heartbeat packet is received is greater than or equal to a prescribed threshold, extending the timeout period.
<Mode 19>
The program according to mode 18, including, in a case where the load of the corresponding second server apparatus is less than or equal to a prescribed threshold, extending the timeout period.
<Mode 20>
The program according to any one of modes 17 to 19, including causing a computer to execute processing of: comparing the number of sessions held by the first server apparatus and the number of sessions held by the corresponding second server apparatus, and determining whether to maintain operation of the first server apparatus as an in-use type without change, or to cause a transition to a standby type.
<Mode 21>
The program according to mode 20, including, in a case where the number of sessions held by the first server apparatus is larger than the number of sessions held by the corresponding second server apparatus, maintaining operation of the first server apparatus as an in-use type without change.
<Mode 22-1>
The program according to mode 20, including, in a case where the number of sessions held by the corresponding second server apparatus is larger than the number of sessions held by the first server apparatus, transitioning operation of the first server apparatus to a standby type, and in other cases, maintaining operation of the first server apparatus as an in-use type without change.
<Mode 22-2>
The program according to mode 20, including, in a case where a prescribed period has elapsed from comprehending that the corresponding second server apparatus has started operation as an in-use type, transitioning operation of the first server apparatus to a standby type, and in other cases maintaining operation of the first server apparatus as an in-use type without change.

It is to be noted that the entire disclosed content of the abovementioned Patent Literature is incorporated herein by reference thereto. Modifications and adjustments of example embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective example embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 1 cluster system
2, 2A, 2B server apparatus
3 cluster management part
4 load monitoring part
5 corresponding node monitoring part
6 heartbeat transmission/reception part
7 heartbeat network
8 call processing network
9 client terminal
10 other node

The invention claimed is:
1. A first server apparatus in a cluster system having two server apparatuses that operate as an in-use type or a standby type, the first server apparatus comprising:
a processor; and
memory storing executable instructions that, when executed by the processor, causes the processor to perform as:
a heartbeat transmission/reception part that transmits and receives a heartbeat packet to and from a corresponding second server apparatus; and
a corresponding node monitoring part that adjusts a timeout period for transitioning operation of the first server apparatus from the standby type to the in-use type, according to a reception state of the heartbeat packet,
wherein the corresponding node monitoring part, in a case where the load of the corresponding second server apparatus is less than or equal to a prescribed threshold, extends the timeout period.

2. The first server apparatus according to claim 1, wherein the corresponding node monitoring part, in a case where the heartbeat packet is dropped or a case where delay time until the heartbeat packet is received is greater than or equal to a prescribed threshold, extends the timeout period.

3. The first server apparatus according to claim 2, comprising a cluster management part that compares the number of sessions held by the first server apparatus and the number of sessions held by the corresponding second server apparatus, and determines whether to maintain operation of the first server apparatus as an in-use type without change, or to cause a transition to a standby type.

4. The first server apparatus according to claim 3, wherein the cluster management part, in a case where the number of sessions held by the first server apparatus is larger than the number of sessions held by the corresponding second server apparatus, maintains operation of the first server apparatus as an in-use type without change.

5. The first server apparatus according to claim 3, wherein the cluster management part, in a case where the number of sessions held by the corresponding second server apparatus is larger than and the number of sessions held by the first server apparatus, or in a case where a prescribed period has elapsed from comprehending that the corresponding second server apparatus has started operation as an in-use type, causes transition of operation of the first server apparatus to standby type, and in other cases maintains operation of the first server apparatus as an in-use type without change.

6. The first server apparatus according to claim 2, wherein the heartbeat transmission/reception part includes a sequence number updated each time the heartbeat packet is transmitted, in the heartbeat packet, to be transmitted to the corresponding second server apparatus.

7. A cluster system comprising the first server apparatus according to claim 2, as one of 2 server apparatuses operating as an in-use type or a standby type.

8. The first server apparatus according to claim 1, wherein the processor further performs as a cluster management part that compares the number of sessions held by the first server apparatus and the number of sessions held by the corresponding second server apparatus, and determines whether to maintain operation of the first server apparatus as an in-use type without change, or to cause a transition to a standby type.

9. The server apparatus according to claim 8, wherein the cluster management part, in a case where the number of sessions held by the first server apparatus is larger than the number of sessions held by the corresponding second server apparatus, maintains operation of the first server apparatus as an in-use type without change.

10. The server apparatus according to claim 8, wherein the cluster management part, in a case where the number of sessions held by the corresponding second server apparatus is larger than and the number of sessions held by the first server apparatus, or in a case where a prescribed period has elapsed from comprehending that the corresponding second server apparatus has started operation as an in-use type, causes transition of operation of the first server apparatus to standby type, and in other cases maintains operation of the first server apparatus as an in-use type without change.

11. The first server apparatus according to claim 1, wherein the heartbeat transmission/reception part includes a sequence number updated each time the heartbeat packet is transmitted, in the heartbeat packet, to be transmitted to the corresponding second server apparatus.

12. A cluster system comprising the first server apparatus according to claim 1, as one of 2 server apparatuses operating as an in-use type or a standby type.

13. A cluster control method, comprising:
transmitting or receiving, by a first server apparatus in a cluster system having two server apparatuses that operate as an in-use type or standby type, a heartbeat packet to or from a corresponding second server apparatus;
adjusting a timeout period for transitioning an operation of the first server apparatus from standby type to in-use type, according to a reception state of the heartbeat packet; and
monitoring load of the corresponding second server apparatus and extending the timeout period, in a case where the load of the corresponding second server apparatus is less than or equal to a prescribed threshold.

14. The cluster control method according to claim 13, comprising:
monitoring the heartbeat packet and extending a timeout period, in a case where the heartbeat packet is dropped or a case where delay time until the heartbeat packet is received is greater than or equal to a prescribed threshold.

15. The cluster control method according to claim 14, comprising:
comparing a number of sessions held by the first server apparatus and a number of sessions held by the corresponding second server apparatus, and determining whether to maintain operation of the first server apparatus as an in-use type without change, or to cause a transition to a standby type.

16. The cluster control method according to claim 15, further comprising:
in a case where the number of sessions held by the first server apparatus is larger than the number of sessions held by the corresponding second server apparatus, maintaining operation of the first server apparatus as an in-use type without change.

17. A non-transitory computer-readable storage medium storing a program that causes a computer provided in a first server apparatus in a cluster system having two server apparatuses that operate as an in-use type or standby type, to execute processings, the program comprising:
transmitting or receiving a heartbeat packet to or from a corresponding second server apparatus;
adjusting a timeout period for transitioning an operation of the first server apparatus from a standby type to an in-use type, according to a reception state of the heartbeat packet; and
monitoring load of the corresponding second server apparatus and extending the timeout period, in a case where the load of the corresponding second server apparatus is less than or equal to a prescribed threshold.

\* \* \* \* \*